(12) United States Patent
Kingma et al.

(10) Patent No.: US 7,846,508 B2
(45) Date of Patent: Dec. 7, 2010

(54) METHOD FOR TREATING WOOD SURFACES

(75) Inventors: Arend Jouke Kingma, Ludwigshafen (DE); Eva Wagner, Speyer (DE); Karl Graf, Ludwigshafen (DE); Klaus Menzel, Ludwigshafen (DE); Holger Militz, Bovenden (DE); Andreas Krause, Goettingen (DE); Yanjun Xie, Goettingen (DE); Carsten Mai, Goettingen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 259 days.

(21) Appl. No.: 11/912,534

(22) PCT Filed: Apr. 28, 2006

(86) PCT No.: PCT/EP2006/004020

§ 371 (c)(1),
(2), (4) Date: Oct. 25, 2007

(87) PCT Pub. No.: WO2006/117163

PCT Pub. Date: Nov. 9, 2006

(65) Prior Publication Data

US 2008/0193785 A1    Aug. 14, 2008

(30) Foreign Application Priority Data

May 2, 2005    (DE) .................. 10 2005 020 387

(51) Int. Cl.
*B05D 3/02* (2006.01)
*B05D 3/06* (2006.01)
*B05D 7/08* (2006.01)

(52) U.S. Cl. .................. 427/408; 427/508; 427/393; 427/397

(58) Field of Classification Search .................. None
See application file for complete search history.

(56) References Cited

U.S. PATENT DOCUMENTS

| 4,913,972 | A | * | 4/1990 | Grunewalder et al. .... 428/425.5 |
| 5,051,283 | A | * | 9/1991 | Beane et al. ................ 427/440 |
| 2006/0051607 | A1 | | 3/2006 | Krause et al. |
| 2006/0194901 | A1 | | 8/2006 | Krause et al. |

FOREIGN PATENT DOCUMENTS

| DE | 25 35 274 | 2/1977 |
| WO | WO 92/10311 | 6/1992 |
| WO | WO 2004/033170 A1 | 4/2004 |
| WO | WO 2004/033171 A1 | 4/2004 |

* cited by examiner

*Primary Examiner*—Erma Cameron
(74) *Attorney, Agent, or Firm*—Oblon, Spivak, McClelland, Maier & Neustadt, L.L.P.

(57) ABSTRACT

The invention relates to a method for the treatment of surfaces of wood or woodbase materials with surface treatment compositions, and the timbers or woodbase materials thus treated by impregnating with a curable aqueous composition of α) low molecular weight compounds V which have at least two N-bonded groups and/or β) precondensates of the compound V and/or γ) reaction products or mixtures of the compound V with at least one alcohol which is $C_1$-$C_6$-alkanols, $C_2$-$C_6$-polyols or oligoalkylene glycols; treating that impregnated material at elevated temperature and) treating at least one surface of the wood or woodbase material to be treated with a surface treatment composition.

14 Claims, No Drawings

METHOD FOR TREATING WOOD SURFACES

The present invention relates to a method for the treatment of surfaces of wood or woodbase materials with surface treatment compositions, and the timbers or woodbase materials thus treated.

Timbers and woodbase materials, such as veneers or moldings comprising finely divided wood materials, are frequently provided with surface treatment compositions, such as stains, finishes or other coatings for decorative purposes or for the protection of wood surfaces from mechanical and weather-related influences (cf. for example H. Nimz et al. "Wood—Wood based Materials", Section 2.4 and W. Hansemann, "Wood—Surface Treatment" in Ullmanns Encyclopedia of Industrial Chemistry, 5th ed. on CD-ROM, Wiley-VCH-Weinheim 1997).

In the case of polymer-bound surface treatment compositions, i.e. in the case of coating systems, such as glazes and finishes, the adhesion of the coating obtained to the surface of the wood or woodbase material is problematic, in particular both in the moist state and in the solid, i.e. dried or hardened, state. In the case of water-based surface treatment compositions, there is also frequently the problem that the wood surface becomes rough on treatment and therefore has to be subsequently sanded in order to obtain a sufficiently smooth surface. Since a part of the surface treatment composition is also removed thereby, the treatment and sanding process must as a rule be repeated several times, which constitutes a not inconsiderable effort.

WO 2004/033170 and WO 2004/033171 describe the use of impregnating compositions based on hydroxymethyl- or alkoxymethyl-modified urea derivatives, such as 1,3-bis(hydroxymethyl)-4,5-dihydroxyimidazolidin-2-one, alkanol-modified bis(hydroxymethyl)-4,5-dihydroxyimidazolidinone, 1,3-bis(hydroxymethyl)urea, 1,3-bis(methoxymethyl)urea, 1-hydroxymethyl-3-methylurea, 1,3-bis(hydroxymethyl)-imidazolidin-2-one, 1,3-dimethyl-4,5-dihydroxyimidazolidin-2-one or tetra-(hydroxymethyl)acetylenediurea for improving the durability, dimensional stability and surface hardness of wood bodies comprising solid wood. The problem in the case of the surface treatment of wood or woodbase material is not discussed.

It is therefore the object of the present invention to provide a method for the surface treatment of wood or woodbase materials which solves the problems described at the outset.

It has now surprisingly been found that this and further objects can be achieved if wood or a woodbase material is surface-treated in a manner known per se with a surface treatment composition, if the wood, the wood-base material or the wood materials used for the production of the wood-base material is impregnated beforehand with a curable aqueous composition which comprises at least one crosslinkable compound which is selected from α) low molecular weight compounds V which have at least two N-bonded groups of the formula $CH_2OR$, where R is hydrogen or $C_1$-$C_4$-alkyl, and/or a 1,2-bishydroxyethane-1,2-diyl group bridging two nitrogen atoms, β) precondensates of the compound V and γ) reaction products or mixtures of the compound V with at least one alcohol which from $C_1$-$C_6$-alkanols, $C_2$-$C_6$-polyols and oligoalkylene glycols;

and then subjected to a treatment at elevated temperature.

The present invention accordingly relates to a method for the treatment of the surfaces of wood or woodbase materials, which comprises the following steps:

a) impregnation of wood, woodbase materials or wood materials for the production of woodbase materials with a curable aqueous composition which comprises at least one crosslinkable compound which is selected from α) low molecular weight compounds V which have at least two N-bonded groups of the formula $CH_2OR$, where R is hydrogen or $C_1$-$C_4$-alkyl, and/or a 1,2-bishydroxyethane-1,2-diyl group bridging two nitrogen atoms, β) precondensates of the compound V and γ) reaction products or mixtures of the compound V with at least one alcohol which from $C_1$-$C_6$-alkanols, $C_2$-$C_6$-polyols and oligoalkylene glycols;

b) treatment of the material obtained in step a) at elevated temperature and, if appropriate, further processing to give a woodbase material and c) treatment of at least one surface of the wood or woodbase material to be treated with a surface treatment composition and, if appropriate, drying of the treated surface in a manner known per se.

The method according to the invention is associated with a number of advantages. Coatings based on polymer-bound coating systems have better adhesion both in the moist and in the wet state. In addition, the above-described problems of the roughening of the surface do not occur in the case of water-based surface treatment compositions. Moreover, the "distortion" of wood bodies occasionally occurring on treatment with water-based surface treatment compositions can be avoided in this way.

In a first step a) of the method according to the invention, the wood or the woodbase material, for example a veneer material or a woodbase material produced by binding finely divided wood materials, such as shavings, fibers or strands, or a wood material which is used for the production of woodbase materials, for example a veneer or finely divided wood material, is impregnated with an aqueous composition of the curable compound.

The finely divided wood materials include fibers, shavings, strands, chips, shreds and the like. Veneers are understood as meaning sheet-like thin wood materials having thicknesses of $\leq 5$ mm, in particular $\leq 1$ mm. In particular, large parts having minimum dimensions above 5 mm, especially $\geq 10$ mm, and especially large parts comprising solid wood or solid timber are impregnated in step a).

In principle, all wood types are suitable, in particular those which can absorb at least 30%, in particular at least 50%, based on their dry weight, of water and particularly preferably those which are classified under impregnatability classes 1 and 2 in accordance with DIN-EN 350-2. These include, for example, timbers of conifers, such as pine (*pinus* spp.), spruce, Douglas fir, larch, Italian stone pine, fir, coastal fir, cedar and Swiss stone pine, and timbers of broad-leaved trees, e.g. maple, hard maple, acacia, ayons, birch, pear, beech, oak, alder, aspen, ash, serviceberry, hazel, hornbeam, cherry, chestnut, lime, American walnut, poplar, olive, locust, elm, walnut, rubber tree, zebrano, willow, Turkey oak and the like. The advantages according to the invention are displayed in particular in the case of the following timbers: beech, spruce, pine, poplar, ash and maple. A preferred embodiment of the invention therefore relates to the surface treatment of wood or wood-base materials whose wood constituent is selected from the abovementioned wood-base materials.

The crosslinkable compounds used in step a), i.e. compounds V and the precondensates and reaction products thereof, are low molecular weight compounds or are oligomers having a low molecular weight, which as a rule are present completely dissolved in the aqueous compositions used. The molecular weight of the crosslinkable compound is usually below 400 Dalton. It is assumed that, owing to these properties, the compounds can penetrate into the cell walls of the wood and, on curing, improve the mechanical stability of the cell walls and reduce their swelling caused by water.

Examples of crosslinkable compounds, without being limited thereto, are:

- 1,3-bis(hydroxymethyl)-4,5-dihydroxyimidazolidin-2-one (DMDHEU),
- 1,3-bis(hydroxymethyl)-4,5-dihydroxyimidazolidinone, which is modified with a $C_1$-$C_6$-alkanol, a $C_2$-$C_6$-polyol or an oligoalkylene glycol (modified DMDHEU or mDMDHEU),
- 1,3-bis(hydroxymethyl)urea,
- 1,3-bis(methoxymethyl)urea;
- 1-hydroxymethyl-3-methylurea,
- 1,3-bis(hydroxymethyl)imidazolidin-2-one (dimethylolethyleneurea),
- 1,3-bis(hydroxymethyl)-1,3-hexahydropyrimidin-2-one (dimethylolpropyleneurea),
- 1,3-bis(methoxymethyl)-4,5-dihydroxyimidazolidin-2-one (DMeDHEU),
- tetra(hydroxymethyl)acetylenediurea
- low molecular weight melamine/formaldehyde resins (MF resins), such as poly(hydroxymethyl)melamine having at least 2, e.g. 2, 3, 4, 5 or 6, N-hydroxymethyl groups, such as trimethylolated melamine (=2,4,6-tris-(N,hydroxymethylamino)-1,3,5-triazine and
- low molecular weight melamine/formaldehyde resins (MF resins), such as poly(hydroxymethyl)melamine having at least 2, e.g. 2, 3, 4, 5 or 6, N-hydroxymethyl groups, which are modified with a $C_1$-$C_6$-alkanol, a $C_2$-$C_6$-polyol or an oligoalkylene glycol (modified MF resins).

Aqueous compositions of compounds V, the precondensates thereof and the reaction products thereof are known per se, for example from WO 2004/033171, WO 2004/033170, K. Fisher et al. "Textile Auxiliaries—Finishing Agents", Section 7.2.2, in Ullmann's Encyclopedia of Industrial Chemistry, 5th Ed. on CD-ROM, Wiley-VCH, Weinheim 1997, and literature cited there, U.S. Pat. No. 2,731,364, U.S. Pat. No. 2,930,715, H. Diem et al. "Amino-Resins", Sections 7.2.1 and 7.2.2, in Ullmann's Encyclopedia of Industrial Chemistry, 5th Ed. on CD-ROM, Wiley-VCH, Weinheim 1997, and literature cited there, Houben-Weyl E20/3, pages 1811-1890, and are usually used as crosslinking agents for textile finishing. Reaction products of N-methylolated urea compounds V with alcohols, e.g. modified 1,3-bis(hydroxymethyl)-4,5-dihydroxyimidazolidin-2-one (mDMDHEU), are disclosed, for example, in U.S. Pat. No. 4,396,391 and WO 98/29393. In addition, compounds V and their reaction products and precondensates are commercially available.

In a preferred embodiment of the invention, the crosslinkable compound is from urea compound V, which carry in each case a $CH_2OR$ group, as defined above, on the nitrogen atoms of the urea unit (N—C(O)—N), and the reaction products of such urea compounds V with $C_1$-$C_6$-alkanols, $C_2$-$C_6$-polyols and oligoalkylene glycols. In particular, the crosslinkable compound is selected from 1,3-bis(hydroxymethyl)-4,5-dihydroxyimidazolidin-2-one and a 1,3-bis(hydroxymethyl)-4,5-dihydroxyimidazolidin-2-one modified with a $C_1$-$C_6$-alkanol, a $C_2$-$C_6$-polyol, and/or a polyalkylene glycol. Examples of polyalkylene glycols are in particular the oligo- and poly-$C_2$-$C_4$-alkylene glycols mentioned below.

mDMDHEU are reaction products of 1,3-bis(hydroxymethyl)-4,5-dihydroxyimidazolidin-2-one with a $C_1$-$C_6$-alkanol, a $C_2$-$C_6$-polyol, an oligoethylene glycol or mixtures of these alcohols. Suitable $C_{1-6}$-alkanols are, for example, methanol, ethanol, n-propanol, isopropanol, n-butanol and n-pentanol, methanol being preferred. Suitable polyols are ethylene glycol, diethylene glycol, 1,2- and 1,3-propylene glycol, 1,2-, 1,3- and 1,4-butylene glycol and glycerol. Examples of suitable polyalkylene glycols are in particular the oligo- and poly-$C_2$-$C_4$-alkylene glycols mentioned below. For the preparation of mDMDHEU, DMDHEU are mixed with the alkanol, the polyol or the polyalkylene glycol. The monohydric alcohol, the polyol or the oligo- or polyalkylene glycol is usually used here in a ratio of from 0.1 to 2.0, in particular from 0.2 to 2, mole equivalents each, based on DMDHEU. The mixture of DMDHEU, the polyol or the polyalkylene glycol is usually reacted in water at temperatures of, preferably, from 20 to 70° C. and a pH of, preferably, from 1 to 2.5, the pH as a rule being adjusted to a range from 4 to 8 after the reaction.

In a further preferred embodiment of the invention, the crosslinkable compound is selected from at least dimethylolated, e.g. dimethylolated, trimethylolated, tetramethylolated, pentamethylolated or hexamethylolated, especially trimethylolated, melamine (poly(hydroxymethyl)melamine) and a poly(hydroxymethyl)melamine modified with a $C_1$-$C_6$-alkanol, a $C_2$-$C_6$-polyol and/or a polyalkylene glycol. Examples of polyalkylene glycols are in particular the oligo- and poly-$C_2$-$C_4$-alkylene glycols mentioned below.

The aqueous compositions used according to the invention may also comprise one or more of the abovementioned alcohols, $C_1$-$C_6$-alkanols, $C_2$-$C_6$-polyols, oligo- and polyalkylene glycols or mixtures of these alcohols. Suitable C-6-alkanols are, for example, methanol, ethanol, n-propanol, isopropanol, n-butanol and n-pentanol, methanol being preferred. Suitable polyols are ethylene glycol, diethylene glycol, 1,2- and 1,3-propylene glycol, 1,2-, 1,3- and 1,4-butylene glycol and glycerol. Suitable oligo- and polyalkylene glycols are in particular oligo- and poly-$C_2$-$C_4$-alkylene glycols, especially homo- and cooligomers of ethylene oxide and/or of propylene oxide, which, if appropriate, are obtainable in the presence of low molecular weight initiators, e.g. aliphatic or cycloaliphatic polyols having at least 2 OH groups, such as 1,3-propanediol, 1,3- and 1,4-butanediol, 1,5-pentanediol, 1,6-hexanediol, glycerol, trimethylolethane, trimethylolpropane, erythritol and pentaerythritol, and pentitols and hexitols, such as ribitol, arabitol, xylitol, dulcitol, mannitol and sorbitol, and inositol or aliphatic or cycloaliphatic polyamines having at least 2 $NH_2$ groups, such as diethylenetriamine, triethylenetetramine, tetraethylenepentamine, propylene-1,3-diamine, dipropylenetriamine, 3-amino-1-ethyleneaminopropane, hexamethylenediamine, dihexamethylenetriamine, 1,6-bis (3-aminopropylamino)hexane, N-methyidipropylenetriamine or polyethylenimine, among which diethylene glycol, triethylene glycol, di-, tri- and tetrapropylene glycol and low molecular weight Pluronic® brands from BASF (e.g. Pluronic® PE 3100, PE 4300, PE 4400, RPE 1720, RPE 1740) are preferred.

If present, the concentration of the crosslinkable compounds in the aqueous dispersion is usually in the range from 1 to 60% by weight, frequently in the range from 10 to 60% by weight and in particular in the range from 15 to 50% by weight, based on the total weight of the composition. If the curable, aqueous composition comprises one of the abovementioned alcohols, the concentration thereof is preferably in the range from 1 to 50% by weight, in particular in the range from 5 to 40% by weight. The total amount of crosslinkable compound and alcohol usually accounts for from 10 to 60% by weight and in particular from 20 to 50% by weight of the total weight of the aqueous composition.

As a rule, the aqueous composition used in step a) comprises at least one catalyst K which effects crosslinking of the compound V or of its reaction product or precondensate. As a rule, metal salts from the group consisting of the metal halides, metal sulfates, metal nitrates, metal phosphates, metal tetrafluoroborates; boron trifluoride; ammonium salts from the group consisting of the ammonium halides, ammonium sulfate, ammonium oxalate and diammonium phosphate; and organic carboxylic acids, organic sulfonic acids, boric acid, phosphoric acid, sulfuric acid and hydrochloric acid are suitable as catalysts K.

Examples of metal salts suitable as catalysts K are in particular magnesium chloride, magnesium sulfate, zinc chloride, lithium chloride, lithium bromide, aluminum chloride, aluminum sulfate, zinc nitrate and sodium tetrafluoroborate.

Examples of ammonium salts suitable as catalysts K are in particular ammonium chloride, ammonium sulfate, ammonium oxalate and diammonium phosphate.

Water-soluble organic carboxylic acids, such as maleic acid, formic acid, citric acid, tartaric acid and oxalic acid, and furthermore benzenesulfonic acids, such as p-toluenesulfonic acid, but also inorganic acids, such as hydrochloric acid, phosphoric acid, sulfuric acid, boric acid and mixtures thereof, are particularly suitable as catalysts K.

The catalyst K is preferably selected from magnesium chloride, zinc chloride, magnesium sulfate, aluminum sulfate and mixtures thereof, magnesium chloride being particularly preferred.

The catalyst K is usually added to the aqueous dispersion only shortly before the impregnation in step a). It is usually used in an amount of from 1 to 20% by weight, in particular from 2 to 10% by weight, based on the total weight of the curable constituents present in the aqueous composition. The concentration of catalyst, based on the total weight of the aqueous dispersion, is usually in the range from 0.1 to 10% by weight and in particular in the range from 0.5 to 5% by weight.

The impregnation can be effected in a customary manner, for example by immersion, by application of reduced pressure, if appropriate in combination with pressure, or by conventional application methods, such as spreading, spraying and the like. The impregnation method used in each case does of course depend on the dimensions of the material to be impregnated. Wood materials having small dimensions, such as shavings or strands, and thin veneers, i.e. materials having a large ratio of surface area to volume, can be impregnated with little effort, for example by immersion or spraying, whereas wood materials having larger dimensions, in particular materials whose smallest dimension is more than 5 mm, for example solid wood, shaped articles comprising solid wood or woodbase materials, are impregnated with application of pressure or reduced pressure, in particular by combined application of pressure and reduced pressure. Advantageously, the impregnation is carried out at a temperature below 50° C., e.g. in the range from 15 to 50° C.

The conditions of the impregnation are as a rule chosen so that the amount of curable constituents of the aqueous composition which is absorbed is at least 1% by weight, in particular at least 5% by weight, based on the dry mass of the untreated material. The absorbed amount of curable constituents may be up to 100% by weight, based on the dry mass of the untreated materials and is frequently in the range from 1 to 60% by weight, preferably in the range from 5 to 50% by weight and in particular in the range from 10 to 50% by weight, based on the dry mass of the untreated material used. The moisture content of the untreated materials used for the impregnation is not critical and may be, for example, up to 100%. Here and below, the term "moisture" is synonymous with the term residual moisture content according to DIN 52183. The residual moisture content is preferably below the fiber saturation point of the wood. Frequently, it is in the range from 1 to 50% and in particular from 5 to 30%.

For the immersion, the wood material, if appropriate after preliminary drying, is immersed in a container in which the aqueous composition is present. The immersion is preferably effected over a period of from a few seconds to 24 h, in particular from 1 min to 6 h. The temperatures are usually in the range from 15° C. to 50° C. The wood material absorbs the aqueous composition, it being possible to control the amount of these constituents which is absorbed by the wood material by means of the concentration of the nonaqueous constituents (i.e. curable constituents) in the aqueous composition and by means of the temperature and the duration of treatment. The amount of constituents which is actually absorbed can be determined and controlled by the person skilled in the art in a simple manner from the weight increase of the impregnated material and the concentration of the constituents in the aqueous composition. Veneers can be pressed beforehand for example by means of press rolls, so-called calenders, which are present in the aqueous impregnating composition. The reduced pressure occurring during relaxation in the wood then leads to accelerated absorption of aqueous impregnating composition.

Impregnation is advantageously effected by combined application of reduced and elevated pressure. For this purpose, the wood material, which as a rule has a moisture content in the range from 1% to 100%, is first brought into contact with the aqueous composition under reduced pressure, which is frequently in the range from 10 to 500 mbar and in particular in the range from 40 to 100 mbar, for example by immersion in the aqueous composition. The duration is usually in the range from 1 min to 1 h. This is followed by a phase at elevated pressure, for example in the range from 2 to 20 bar, in particular in the range from 4 to 15 bar and especially from 5 to 12 bar. The duration of this phase is usually in the range from 1 min to 12 h. The temperatures are usually in the range from 15 to 50° C. The wood material absorbs the aqueous composition, it being possible to control the amount of these constituents which is absorbed by the wood material by means of the concentration of the nonaqueous constituents (i.e. curable constituents) in the aqueous composition, by means of the pressure and by means of the temperature and the duration of treatment. The amount actually absorbed can also be calculated here from the weight increase of the wood material.

Impregnation can furthermore be effected by conventional methods for applying liquids to surfaces, e.g. by spraying or roll-coating or spreading. A material having a moisture content of not more than 50%, in particular not more than 30%, for example in the range from 12% to 30%, is advantageously used for this purpose. The application is usually effected at temperatures in the range from 15 to 50° C. The spraying can be carried out in a conventional manner in all apparatuses suitable for the spraying of sheet-like or finely divided bodies, for example by means of nozzle arrangements and the like. In the case of spreading or roll-coating, the desired amount of aqueous composition is applied to the sheet-like materials by means of rolls or brushes.

The curing of the crosslinkable constituents of the aqueous composition is subsequently effected in step b). The curing can be carried out analogously to the methods described in the prior art, for example by the methods described in WO 2004/033170 and WO 2004/033171.

The curing is typically effected by treating the impregnated material at temperatures above 80° C., in particular above 90° C., e.g. in the range from 90 to 220° C. and in particular in the range from 100 to 200° C. The time required for the curing is typically in the range from 10 min to 72 hours. In the case of veneers and finely divided wood materials, the use of higher temperatures and shorter times is more likely. During the curing, not only are the pores in the wood filled with the cured impregnating composition but crosslinking occurs between impregnating composition and the wood itself.

If appropriate, a drying step, also a preliminary drying step below, can be carried out before the curing. Here, the volatile constituents of the aqueous composition, in particular the water and excess organic solvents which do not react in the curing/crosslinking of the urea compounds, are partly or completely removed. Preliminary drying means that the wood or woodbase material is dried below the fiber saturation point, which, depending on the type of wood, is at about 30% by weight. The preliminary drying counteracts the risk of cracking. In the case of small wood bodies, for example veneers, the preliminary drying can be omitted. In the case of wood bodies having larger dimensions, the preliminary drying is, however, advantageous. If a separate preliminary drying is carried out, this is advantageously effected at temperatures in the range from 20 to 80° C. Depending on the chosen drying temperature, partial or complete curing/crosslinking of the curable constituents present in the composition can take place. The combined preliminary drying/curing of the impregnated materials is usually effected by application of a temperature profile which may range from 50° C. to 220° C., in particular from 80 to 200° C.

The curing/drying can be carried out in a conventional fresh air-exhaust air system, e.g. a rotary dryer. The preliminary drying is preferably effected in a manner such that the moisture content of the wood or woodbase material is not more than 30%, in particular not more than 20%, based on the dry mass, after the preliminary drying. It may be advantageous to carry out the drying/curing up to a moisture content of <10% and in particular <5%, based on the dry mass. The moisture content can be controlled in a simple manner by means of the temperature, the duration and the pressure chosen for the preliminary drying.

If appropriate, adhering moisture would be removed by mechanical method prior to the drying/curing.

In the case of large materials, it has proven useful to fix them during the drying/curing, for example in heating presses.

If they are not already fabricated end products, the wood materials impregnated in step a) can be further processed in the manner known per se, in the case of finely divided materials, for example, to give moldings, such as OSB boards (oriented structural board), particle boards, wafer boards, OSL boards and shaped OSL articles (oriented strand lumber), PSL boards and shaped PSL articles (parallel strand lumber), insulation panels and medium density (MDF) and high density (HDF) fiber boards and the like, in the case of veneers to give veneer materials, such as veneered fiber boards, veneered block-boards, veneered particle boards, including veneered OSL and PSL boards (oriented and parallel strand lumber, respectively), plywood, glued laminated board, laminated wood, veneered laminated wood (e.g. Kerto laminated wood), multiplex boards, laminated veneer lumber (LVL), decorative veneer lumbers, such as cladding, ceiling and prefinished parquet panels, but also nonplanar 3-dimensionally shaped components, such as shaped laminated wood articles, shaped plywood articles and other arbitrary shaped articles laminated with at least one veneer layer. The further processing can be effected immediately after the impregnation in step a) or during or after the curing in step b). In the case of impregnated veneers, the further processing is advantageously carried out before the curing step or together with the curing step. In the case of moldings comprising finely divided materials, the shaping step and curing step are carried out simultaneously.

If the impregnated wood material is solid wood or a fabricated woodbase material, this can be processed, before the treatment in step c), in a conventional manner, for example by sawing, planing, sanding, etc. Solid wood impregnated and cured according to the invention is particularly suitable for the production of articles which are exposed to moisture and in particular weathering influences, for example for construction timbers, beams, wood components, for wood balconies, shingles, fences, wooden posts and railroad sleepers, and in shipbuilding for the interior trim and for superstructures.

In step c) of the method according to the invention, at least one surface of the wood or woodbase material obtained in step b) is treated with a surface treatment composition.

The term surface treatment composition comprises in principle all chemical compositions which are used for surface treatment, in particular of wood or woodbase materials, i.e. non-polymer-bound colorant formulations, such as stains, and polymer-bound coating systems, such as finishes, including clear varnish, brillant varnish, silk luster varnish, matt varnish, colored varnish and powder coats, and furthermore top coats, glazes and primers and undercoats, but also films.

Here and below, the term "drying of the surface treatment composition" comprises both physical drying by removal of volatile constituents from coatings which were obtained by surface treatment with solvent-containing or water-based coating compositions and the curing/crosslinking in the case of curable surface treatment compositions.

The surface treatment compositions can in principle be solid, semisolid, e.g. pasty, or, in particular, liquid. Liquid surface treatment compositions may be both solvent-based and water-based. In this context, solvent-based means that the liquid constituents of the surface treatment composition substantially comprise organic solvents, including reactive diluents, i.e. in an amount of at least 60% by weight, based on the liquid constituents. In this context, water-based means that the liquid constituents of the surface treatment composition substantially comprise water, i.e. in an amount of at least 60% by weight, in particular at least 80% by weight, based on the liquid constituents.

The polymer-bound surface treatment compositions typically comprise at least one polymeric binder or one prepolymer, the latter curing under exposure of UV radiation and/or heat to give a polymeric binder.

The polymeric binders in turn may be
physically drying binders, i.e. a polymer film forms on drying without significant crosslinking of the polymer chains with one another taking place,
self-crosslinking binders, i.e. the polymer chains of the binder have functional groups which react with one another or with a crosslinking substance with bond formation, i.e. crosslinking, on drying of the coating, if appropriate by the action of UV radiation,
UV-crosslinkable binders or heat-curable binders, i.e. the polymer chains or the prepolymers of the binder have functional groups which react with a crosslinking substance upon exposure to elevated temperature and/or UV radiation with bond formation and thus result in crosslinking of the polymer. Binders which are crosslinked with the combined use of UV light and heat are also referred to as dual-cure systems.

An overview of surface treatment compositions for wood is to be found in "Wood—Surface Treatment" in Ullmanns Encyclopedia of Industrial Chemistry, 5th ed. on CD-ROM, Wiley-VCH—Weinheim 1997.

According to a first embodiment of the invention, the surface treatment composition used in step c) comprises, as a binder, a polymer and/or prepolymer crosslinkable by heat or UV radiation.

Polymers or prepolymers which can be crosslinked by UV radiation typically have ethylenically unsaturated double bonds which can undergo free radical polymerization upon exposure to electromagnetic radiation, such as UV radiation or electron beams. As a rule, the content of ethylenically unsaturated double bonds in the polymer or prepolymer will be in the range from 0.01 to 1.0 mol/100 g, frequently in the range from 0.05 to 0.8 mol/100 g and very particularly preferably from 0.1 to 0.6 mol/100 g of polymer/prepolymer. Prepolymers preferably have a number average molecular weight Mn of from 500 to 5000 g/mol, whereas the molecular weight of the polymers may be, as a rule, up to 100 000 g/mol.

In a development of this embodiment, the ethylenically unsaturated double bonds are present in the form of groups of the formula A

$$A\text{-}X\text{—}CR^1\text{=}CH_2 \quad\quad A$$

where A is O or $NR^2$ or a chemical bond, $R^2$ being hydrogen or $C_1$-$C_4$-alkyl, X being a chemical bond, a carbonyl group or a $CH_2$ group, and $R^1$ being hydrogen or $C_1$-$C_4$-alkyl. In particular, the double bonds are present in the form of an acrylate group or of a methacrylate group, i.e. X is a carbonyl group, A is in particular oxygen and $R^1$ is in particular hydrogen or methyl.

In another development of this embodiment, the double bond is part of a long-chain alkyl group.

In a third development of this embodiment, the double bond is part of the polymer backbone.

In a particularly preferred embodiment of the invention, the binder comprises a UV-curable polymer or prepolymer, in which the double bonds are present in the form of double bonds of the formula A and in particular as acrylate and/or methacrylate groups. If appropriate, the binder additionally comprises one or more reactive diluents. The UV-curable (pre)polymer typically has a number average molecular weight in the range from 500 to 50 000 Dalton.

Such (pre)polymers are known to the person skilled in the art, for example from P. K. T. Oldring (editor), Chemistry and Technology of UV- and EB-Formulations for Coatings and Paints, Vol. II, SITA Technology, London, 1991, pages 37 to 206, and from the literature cited therein, and are commercially available. Depending on the structure of the (pre)polymer, the (pre)polymers carrying acrylate or methacrylate groups are, for example, polyether (meth)acrylates, polyester (meth)acrylates, urethane (meth)acrylates, silicone (meth) acrylates, epoxy (meth)acrylates, melamine (meth)acrylates, (meth)acrylate-modified polyurethanes and (meth)acrylate-modified copolymers based on (meth)acrylic esters. Among these, in particular aliphatic and aromatic urethane(meth) acrylates and mixtures thereof with reactive diluents are preferred.

Reactive diluents are low molecular weight, liquid compounds which have at least one polymerizable, ethylenically unsaturated double bond. An overview of reactive diluents is to be found, for example, in J. P. Fouassier (editor), Radiation Curing in Polymer Science and Technology, Elsevier Science Publisher Ltd., 1993, Vol. 1, pp. 237-240. Reactive diluents based on esters of acrylic acid or of methacrylic acid with aliphatic di- or polyols are preferred, at least two of the OH groups of the di- or polyols being esterified with acrylic acid or methacrylic acid. Suitable aliphatic di- or polyols have, as a rule, 2 to 20 carbon atoms and may have a linear, branched or cyclic carbon skeleton. They preferably comprise no functional groups. Apart from one or two ether oxygens, they preferably have no heteroatoms. Examples of such reactive diluents are butanediol diacrylate, hexanediol diacrylate, octanediol diacrylate, decanediol diacrylate, cyclohexanediol diacrylate, trimethylolpropane triacrylate, pentaerythrityl tetraacrylate, dipentaerythrityl penta/hexaacrylate, dipropylene glycol diacrylate and the corresponding esters of methacrylic acid and the products LR 8887, PO 33F, LR 8967 and LR 8982 sold under the Laromer® brands of BASF AG. Other suitable reactive diluents are (meth)acrylic acid and the $C_1$-$C_{10}$-alkyl esters thereof, maleic acid and the $C_1$-$C_{10}$-alkyl esters or monoesters thereof, vinyl acetate, vinyl ether, divinylureas, polyethylene glycol di(meth)acrylate, vinyl (meth)acrylate, allyl (meth)acrylate, styrene, vinyltoluene, divinylbenzene, tris(acryloyloxymethyl) isocyanurate, ethoxyethoxyethyl acrylate, N-vinylpyrrolidone, phenoxyethyl acrylate, dimethylaminoethyl acrylate, hydroxyethyl (meth)acrylate, butoxyethyl acrylate, isobornyl (meth)acrylate, dimethacrylamide and dicyclopentyl acrylate, and the long-chain linear diacrylates described in EP 0 250 631 A1 and having a molecular weight of from 400 to 4000, preferably from 600 to 2500, Dalton. The reaction product of 2 mol of acrylic acid with one mole of a dimeric fatty alcohol which has in general 36 carbon atoms may also be used. Mixtures of said monomers are also suitable.

According to a further development of this embodiment, the surface treatment composition comprises, as a binder, at least one unsaturated polyester. This is understood as meaning polyesters which are obtained by condensation of ethylenically unsaturated di- or polycarboxylic acids, such as maleic acid, fumaric acid and the like, or the ester-forming derivatives thereof with di- or polyols, if appropriate in combination with other di- or polycarboxylic acids. Ethylenically unsaturated polyesters are likewise known to the person skilled in the art, for example from UV- and EB-Formulations for Coatings and Paints, Vol. II, SITA Technology, London, 1991, pages 211 to 219, and from the literature cited therein, and are commercially available. They include in particular the condensates of maleic acid or maleic anhydride with diols, such as ethylene glycol, 1,2-propylene glycol, 1,4-butanediol, 1,5-pentanediol, neopentylglycol and 1,6-hexanediol, and in particular 1,2-propylene glycol, and the cocondensates of maleic acid or maleic anhydride with dicarboxylic acids or the anhydrides thereof, such as succinic acid, succinic anhydride, glutaric acid, glutaric anhydride, adipic acid, phthalic acid, terephthalic acid, isophthalic acid and in particular phthalic anhydride and the abovementioned diols.

The UV-curable coating compositions comprise as a rule from 0.01 to 5% by weight, preferably from 0.1 to 2% by weight, in particular from 0.2 to 1% by weight, of at least one photoinitiator which can initiate the polymerization of ethylenically unsaturated double bonds. These include benzophenone and benzophenone derivatives, such as 4-phenylbenzophenone and 4-chlorobenzophenone, Michler's ketone, anthrone, acetophenone derivatives, such as 1-benzoylcyclohexan-1-ol, 2-hydroxy-2,2-dimethylacetophenone and 2,2-dimethoxy-2-phenylacetophenone, benzoin and benzoin ethers, such as methyl-, ethyl- and butylbenzoin ether, benzil ketals, such as benzil dimethyl ketal, 2-methyl-1-(4-methylthiophenyl)-2-morpholinopropan-1-one, anthraquinone and its derivatives, such as β-methylanthraquinone and tert-butylanthraquinone, acylphosphine oxides, such as 2,4,6-trimethylbenzoyl-diphenylphosphine oxide, ethyl-2,4,6-trimethylbenzoylphenylphosphinate and bisacylphosphine oxides. Such initiators are, for example, the products commercially available under the brands Irgacure® 184, Darocure® 1173 from Ciba Geigy, Genocure® from Rahn or Lucirin® TPO from BASF AG.

The UV-curable surface treatment compositions may be both nonaqueous and aqueous. In the case of nonaqueous developments, they typically comprise one or more organic solvents and/or one or more reactive diluents for establishing a suitable processing viscosity. In the case of aqueous formulations, the UV-curable binder (pre)polymers are present in the form of an aqueous dispersion. Depending on the intended use and development, the UV-curable surface treatment compositions may comprise up to 35% by weight of conventional assistants, such as thickeners, leveling agents, antifoams, UV stabilizers, lubricants and fillers. Suitable assistants are sufficiently well known to the person skilled in the art from coating technology. Suitable fillers comprise silicates, for example silicates obtainable by hydrolysis of silicon tetrachloride, such as AerosilR from Degussa, silica, talc, aluminum silicates, magnesium silicates, calcium carbonates, etc. Suitable stabilizers comprise typical UV absorbers, such as oxanilides, triazines and benzotriazole (latter obtainable as Tinuvin® brands from Ciba-Spezialitattenchemie) and benzophenones. These can be used alone or together with suitable free radical scavengers, for example sterically hindered amines, such as 2,2,6,6-tetramethylpiperidine, 2,6-di-tert-butylpiperidine or derivatives thereof, e.g. bis(2,2,6,6-tetramethyl-4-piperidyl) sebacate. Stabilizers are usually used in amounts of from 0.1 to 5.0% by weight and preferably from 0.5 to 3.5% by weight, based on the coating composition.

According to a further embodiment of the invention, the surface treatment composition is a polymer-bound surface treatment composition which comprises, as a binder, a so-called heat-curable polymer or prepolymer. Such heat-curable systems comprise, as a rule, at least one reactive polymer which has reactive groups, such as isocyanate groups, which, if appropriate, are reversibly blocked, epoxide groups, in particular in the form of glycidyl groups, alcoholic OH groups, primary and secondary amino groups, carboxyl groups, anhydride groups, acid chloride groups, carbonyl groups, such as aldehyde or keto groups, N-hydroxymethyl groups and the like, and at least one crosslinking agent which has at least two reactive groups complementary to the reactive groups of the polymer. Examples of pairs of reactive groups having reactivity complementary to one another are isocyanate/hydroxyl, isocyanate/amino, anhydride/hydroxyl, anhydride/amino, carbonyl/amino, carbonyl, hydrazide or semicarbazide, aldehyde/urea, acyl chloride/hydroxyl, glycidyl/hydroxyl, glycidyl/amino, hydroxyl/N-hydroxymethyl, glycidyl/carboxyl, aziridine/carboxyl, hydroxy/carbodiimide, aziridine/hydroxyl, etc. In particular, the reactive polymer is a resin having hydroxyl groups, e.g. a polyurethane carrying hydroxyl groups, a polymer carrying hydroxyl groups and based on alkyl (meth)acrylates (acrylate resin, cf. Römpp-Lexikon, Lacke und Druckfarben, Georg-Thieme-Verlag, Stuttgart, 1998, page 11 et seq.), and the crosslinking agent is a crosslinking agent having isocyanate groups, e.g. a polyisocyanate having 2 to 4 isocyanate groups, e.g. an allophanate, biuret or cyanurate of an aliphatic or aromatic diisocyanate. Combinations of resins carrying hydroxyl groups, in particular acrylate resins, with crosslinking agents carrying N-hydroxymethyl groups, such as melamine/formaldehyde resins, are also suitable. 2-Component varnishes are as a rule solvent-based but may also be formulated as water-based varnishes having a low content of organic solvents, as a rule up to 25% by weight, in particular up to 10% by weight. Depending on the development, surface treatment compositions which comprise so-called 2-component systems as the binder may comprise conventional assistants, such as thickeners, leveling agents, antifoams, UV stabilizers, lubricants and fillers, in the amounts typical for this purpose. They frequently comprise a catalyst which promotes the crosslinking reaction, for example an acid or, in the case of isocyanate-based systems, organotin compounds.

The heat-curable systems also include those resins in which the polymer or prepolymer to be cured carries reactive groups complementary to one another within a polymer chain.

The heat-curable systems furthermore include the abovementioned polymers and prepolymers which have ethylenically unsaturated double bonds. In this case, instead of the UV initiators, the coating compositions comprise a polymerization initiator which results in polymerization of these groups and hence free radical crosslinking under the action of elevated temperature.

According to a further embodiment of the invention, the surface treatment composition is a nitrocellulose lacquer or a nitrocellulose combination lacquer (acrylate resin, cf. Römpp-Lexikon, Lacke und Druckfarben, Georg-Thieme-Verlag, Stuttgart, 1998, page 11 et seq.). These are understood as meaning solvent-based, polymer-bound, physically drying surface treatment compositions which comprise, as binders, nitrocellulose, if appropriate in combination with one or more synthetic hard resins and, if appropriate, plasticizers in an organic solvent or solvent mixture. Typical plasticizers comprise dialkyl adipates, dialkyl phthalates, soft resins, such as alkyd resins and the like. Suitable synthetic resins comprise in particular the abovementioned acrylate resins and ketone resins. Typical solvents for nitrocellulose (combination) lacquers are aromatic solvents, such as xylenes, esters of aliphatic carboxylic acids with $C_2$-$C_{10}$-alkanols, in particular esters of acetic acid, such as ethyl, propyl, butyl or amyl acetate, ethers, such as dipropylene glycol, dibutyl glycol, $C_1$-$C_{10}$-alkanols, such as methanol, ethanol, propanol, butanol and the like, in particular combinations of high-boiling solvents with low-boiling solvents and, if appropriate, solvents boiling in a medium temperature range. Such lacquers may comprise additives, assistants and fillers customary for this purpose, e.g. dulling agents and the like.

According to a further embodiment of the invention, the surface treatment composition is a coating composition whose binder comprises at least one alkyd resin. Such surface treatment compositions are also referred to as alkyd lacquers or alkyd resin lacquers and may be both solvent-based and water-based. Suitable alkyd resins and lacquers based on alkyd resins are known to the person skilled in the art (cf. Römpp-Lexikon, Lacke und Druckfarben, Georg-Thieme-Verlag, Stuttgart, 1998, pages 20-22, and F. N. Jones, "Alkyd-Resins" in Ullmanns Encyclopedia of Industrial Chemistry, 5th ed. on CD-ROM, Wiley-VCH-Weinheim 1997). The alkyd resins are known to be polycondensates of polyols which have at least 3 and frequently 3 or 4 OH groups, such as glycerol, pentaerythritol, trimethylolpropane, trimethylolethane and the like, with polybasic carboxylic acids or with the anhydrides thereof, such as phthalic acid, the anhydride thereof, isophthalic acid, trimellitic acid, the anhydride thereof, maleic acid, the anhydride thereof, azelaic acid, adipic acid, sebacic acid and the like, it being possible for a part of the OH groups to be esterified with a fatty acid, the fatty acid typically being used in the preparation in the form of an oil or of a fat, i.e. of a triglyceride, and accordingly also being referred to as oil component. Examples of oil components are drying oils, such as linseed oil, oiticica oil and wood oil, semidrying oils, such as soybean oil, ricinene oil, tall oil and safflower oil, and nondrying oils, such as castor oil and coconut oil. The fatty acid constituents may also be a Koch acid, which is referred to as Versatic®. Corresponding alkyd resins are available under the name Cardura resins. In alkyd resin-based coating compositions, the alkyd resins can be modified with other components, such as oils, natural resins, phenol resins, melamine resins, urea resins, acrylate resins, epoxy resins, silicone resins, isocyanates and polyurethanes (modified alkyd resins). Depending on the type of fatty acid component and on the modifying constituents, alkyd resins can be designed in a known manner as physically drying coating compositions and as crosslinking coating compositions (air- or oven-drying).

In preferred embodiments of the invention, a surface treatment composition which is selected from water-based surface treatment compositions is used. In contrast to solvent-based surface treatment compositions, the water-based surface treatment compositions have, as solvents or diluents, substantially water and only small amounts of organic solvents, as a rule not more than 20% by weight and in particular not more than 10% by weight, based on the total weight of the surface treatment composition.

A preferred embodiment relates to polymer-bound, water-based surface treatment compositions. Such surface treatment compositions comprise at least one polymeric binder in the form of an aqueous polymer dispersion. The polymers of the aqueous polymer dispersion may be primary dispersions, i.e. polymer dispersions which were prepared by free radical aqueous emulsion polymerization, as well as secondary dispersions, i.e. polymer dispersions in which the dispersed polymer was first prepared by polymerization in an organic solvent and the organic solvent was then replaced by water. The aqueous polymer dispersions can, as described above, be physically drying dispersions, self-crosslinking dispersions, UV-curable dispersions, heat-curable dispersions, dispersions crosslinkable by addition of a crosslinking agent (2-component dispersions) or dual-cure systems.

According to a first embodiment of polymer-bound, water-based surface treatment compositions, such said compositions are those which comprise a physically drying polymer dispersion as a binder. Such dispersions are sufficiently well known to the person skilled in the art, for example from D. Distler, "Wässrige Polymerdispersionen", Wiley-VCH Weinheim 1999, Section 6.5, from M. Schwartz, R. Baumstark, Waterbased Acrylates for Decorative Coatings", Curt R. Vincentz-Verlag Hanover 2001, pages 191-212, and literature cited therein, and from EP-A 184091, EP-A 376096, EP-A 379892, EP-A 522789, EP-A 609793, EP-A 439207, EP-A 609756, EP-A 623659, EP 710680, WO 95/16720, DE 1220613, DE-A 3418524, U.S. Pat. No. 3,454,516, U.S. Pat. No. 5,263,193, U.S. Pat. No. 5,185,387 and U.S. Pat. No. 5,021,469.

The physically drying dispersions are aqueous polymer dispersions which are obtainable by emulsion polymerization of ethylenically unsaturated monomers and typically comprise, incorporated in the form of polymerized units, at least 80% by weight, e.g. from 80 to 100% by weight and especially from 90 to 99% by weight, based on the total amount of monomers, of at least one monoethylenically unsaturated monomer having a limited water solubility of, as a rule, $\leq 30$ g/l at 25° C. (monomer M1). Examples of monomers (M1) are vinylaromatics, such as styrene, vinyl esters of aliphatic carboxylic acids, such as vinyl acetate, vinyl propionate and the like, esters of monoethylenically unsaturated $C_3$-$C_6$-mono- and $C_4$-$C_6$-dicarboxylic acids with $C_1$-$C_{10}$-alkanols, in particular the esters of acrylic acid and of methacrylic acid with $C_1$-$C_{10}$-alkanols, such as ethyl acrylate, n-propyl acrylate, n-butyl acrylate, tert-butyl acrylate, n-hexyl acrylate, n-octyl acrylate, 2-ethylhexyl acrylate, methyl methacrylate, ethyl methacrylate, n-butyl methacrylate, n-hexyl methacrylate, 2-ethylhexyl methacrylate, and furthermore butadiene and $C_2$-$C_6$-olefins, such as ethylene or propylene. Preferred among these are those polymer dispersions in which polymers comprise, as monomer M1 incorporated in the polymerized units, $C_1$-$C_{10}$-alkyl acrylates and/or $C_1$-$C_{10}$-alkyl methacrylates, if appropriate in combination with vinylaromatics, such as styrene.

In addition, the monomers constituting the polymer of the aqueous polymer dispersion may comprise, incorporated in the form of polymerized units, up to 20% by weight, e.g. from 0.1 to 20% by weight and in particular from 1 to 10% by weight, of monomers differing from the monomers M1.

These include monoethylenically unsaturated acids (monomers M2) having, as a rule, 2 to 10 carbon atoms, e.g. mono- and dicarboxylic acids, such as acrylic acid, methacrylic acid, fumaric acid or itaconic acid, sulfonic acids, such as vinylsulfonic acid, 2-acrylamido-2-methylpropane-sulfonic acid and the like, neutral monoethylenically unsaturated monomers having an increased water solubility of, as a rule, at least 50 g/l and in particular at least 80 g/l at 25° C. (monomers M3), such as the amides of the abovementioned monoethylenically unsaturated carboxylic acids, e.g. acrylamide, methacrylamide, hydroxy-$C_2$-$C_4$-alkyl esters of the abovementioned monoethylenically unsaturated monocarboxylic acids, e.g. 2-hydroxyethyl acrylate, 2- and 3-hydroxypropyl acrylate, 4-hydroxybutyl acrylate, 2-hydroxyethyl methacrylate, 2- and 3-hydroxypropyl methacrylate, 4-hydroxybutyl methacrylate and monoethylenically unsaturated monomers having oligoalkylene oxide chains, preferably having polyethylene oxide chains, having degrees of oligomerization of, preferably, in the range from 2 to 200, e.g. monovinyl and monoallyl ethers of oligoethylene glycols and esters of acrylic acid, of maleic acid or of methacrylic acid with oligoethylene glycols. The monomers M3 include in particular monoethylenically unsaturated monomers carrying urea groups, such as N-vinyl- and N-allylurea, and derivatives of imidazolidin-2-one, e.g. N-vinyl- and N-allylimidazolidin-2-one, N-vinyloxyethylimidazolidin-2-one, N-allyloxyethylimidazolidin-2-one, N-(2-acrylamidoethyl)imidazolidin-2-one, N-(2-acryloxyethyl)imidazolidin-2-one, N-(2-methacrylamidoethyl)imidazolidin-2-one, N-(2-methacryloxyethyl)imidazolidin-2-one (=ureidomethacrylate), N-[2-(acryloxyacetamido)ethyl]imidazolidin-2-one, N-[2-(2-acryloxyacetamido)ethyl]-imidazolidin-2-one and N-[2-(2-methacryloxyacetamido)ethyl]imidazolidin-2-one (monomers M3a). The monomers M2 account as a rule for up to 10% by weight, in particular up to 5% by weight, e.g. from 0.1 to 5% by weight, based on the total amount of monomers. The total amount of monomers M3 will as a rule not exceed 10% by weight, in particular 9% by weight. If desired, the monomers M3a account for from 0.1 to 10% by weight, in particular from 0.5 to 5% by weight, of the total amount of monomers.

Among the physically drying dispersions, those polymer dispersions whose polymer particles comprise at least one polymer phase having a high glass transition temperature $T_g1$ and at least one polymer phase having a low glass transition temperature $T_g2$ are particularly preferred, the difference between $T_g1$ and $T_g2$ advantageously being at least 20 K, in particular at least 30 K and especially at least 40 K, e.g. from 40 to 150 K. In particular, $T_g2$ is in the range from −60 to +40° C. and especially in the range from −20 to +30° C. $T_g1$ is preferably in the range from 50 to 130° C. and in particular in the range from 60 to 120° C.

It has furthermore proven advantageous if the polymer particles of the aqueous polymer dispersion have a weight average polymer particle diameter in the range from 50 to 1000 nm (determined by means of an ultracentrifuge or photon correlation spectroscopy; for particle size determination by means of an ultracentrifuge, cf. for example W. Machtle, Makromolekulare Chemie, 1984, Vol. 185, pp. 1025-1039, W. Mächtle, Angew. Makromolekulare Chemie, 1988, Vol. 162, pp. 35-42). In the case of binder dispersions having high solids contents, e.g. >50% by weight, based on the total weight of the binder dispersion, it is advantageous, for reasons relating to the viscosity, if the weight average particle diameter of the polymer particles in the dispersion is $\geqq 150$ nm. The mean particle diameter will as a rule not exceed 1000 nm and preferably 600 nm. Furthermore, it is advantageous if the individual particle diameters of the polymer particles are not uniform but are distributed over a relatively large diameter range.

Furthermore, the physically drying polymer dispersions comprise at least one surface-active substance for stabilizing the polymer dispersion. Both protective colloids usually used for carrying out the free radical aqueous emulsion polymerizations and emulsifiers are suitable for this purpose. The surface-active substances are usually used in amounts of from 0.1 to 10% by weight, preferably from 0.5 to 5% by weight, based on the total amount of the monomers to be polymerized.

Suitable protective colloids are, for example, polyvinyl alcohols, starch derivatives and cellulose derivatives or copolymers comprising vinylpyrrolidone. A detailed description of further suitable protective colloid is to be found in Houben-Weyl, Methoden der organischen Chemie, Volume XIV/1, Makromolekulare Stoffe, Georg-Thieme-Verlag, Stuttgart 1961, pages 411-420.

Preferred surface-active substances are emulsifiers whose relative molecular weights, in contrast to the protective colloids, are usually less than 2000. They may be either anionic, cationic or nonionic, anionic emulsifiers and combinations thereof with nonionic emulsifiers being preferred. The anionic emulsifiers include alkali metal and ammonium salts of alkylsulfates (alkyl radical: $C_8$-$C_{12}$), of sulfuric acid monoesters of ethoxylated alkanols (degree of ethoxylation: from 2 to 50, alkyl radical: $C_{12}$ to $C_{18}$) and of ethoxylated alkylphenols (degree of ethoxylation: from 3 to 50, alkyl radical: $C_4$-$C_9$), of alkanesulfonic acids (alkyl radical: $C_{12}$-$C_{18}$), of alkylarylsulfonic acids (alkyl radical: $C_9$ to $C_{18}$) and of mono- and dialkyldiphenyl ether sulfonates, as described, for example, in U.S. Pat. No. 4,269,749.

Suitable nonionic emulsifiers are araliphatic or aliphatic nonionic emulsifiers, for example ethoxylated mono-, di- and trialkylphenols (degree of ethoxylation: from 3 to 50, alkyl radical: $C_4$-$C_9$), ethoxylates of long-chain alcohols (degree of ethoxylation: from 3 to 50, alkyl radical: $C_8$-$C_{36}$) and polyethylene oxide/polypropylene oxide block copolymers. Ethoxylates of long-chain alkanols (alkyl radical: $C_{10}$-$C_{22}$, average degree of ethoxylation: from 3 to 50) are preferred, and among these, those based on oxo alcohols and natural alcohols having a linear or branched $C_{12}$-$C_{18}$-alkyl radical and a degree of ethoxylation of from 8 to 50 are particularly preferred.

The surface treatment compositions used according to the invention and based on physically drying polymer dispersions may also comprise conventional additives, such as fillers, pigments, dispersants for pigments/fillers, antifreezes, plasticizers, thickeners, biocides and the like in the amounts customary for this purpose. The surface treatment compositions may be formulated without pigments, i.e. as clear varnish, as glazes and brillant varnish and silk luster varnish having a low pigment content with pigment volume concentrations below 25%, and as silk luster and matt varnish having higher pigment volume concentrations of >25%.

Instead of or together with physically drying polymer dispersions, polymer-bound aqueous surface treatment compositions suitable according to the invention may also comprise aqueous dispersions of self-crosslinking, UV-curable or heat-curable binder polymers. Physically drying polymer dispersions can also be used as a formulation with water-dispersible alkyd resins and/or waxes.

Self-crosslinking polymer dispersions are known to be aqueous polymer dispersions whose polymers have reactive groups which react with one another or with a crosslinking substance present therein, with bond formation, i.e. the polymer has different reactive groups complementary to one another within the polymer chain, or polymer and crosslinking substance have reactive groups complementary to one another. Examples of pairs of groups having reactivity complementary to one another are those pairs of functional groups which are stated above in relation to heat-curable systems. In particular, the polymer component has the following as functional groups in the self-crosslinking systems:

carboxyl groups and/or anhydride groups which crosslink by addition of salts of polyvalent cations, e.g. zinc or calcium salts, or by addition of a polyamine or of a polyol, or a combination of OH and carboxyl groups which react with one another, or isocyanate groups which react with a polyol or a polyamine as a crosslinking substance, or OH groups which react with a crosslinking substance which is selected from polyaziridines, polycarbodiimides, water-dispersible polyisocyanates and polyepoxides, e.g. epoxysilanes, or a combination of isocyanate groups which, if appropriate, are reversibly blocked by suitable protective groups, and OH groups, or keto groups which crosslink by addition of polyamines, semicarbizides or polyhydrazides or urea groups which crosslink by addition of polyaldehydes, such as glyoxal.

The polymers of self-crosslinking dispersions may be polymers based on ethylenically unsaturated monomers, as described above for the physically drying dispersions, which polymers comprise corresponding functional monomers incorporated in the form of polymerized units. Polyurethane-based dispersions which have the desired functional groups as a result of incorporation of corresponding monomers and/or through the choice of the stoichiometry of the polyurethane-forming monomers are also suitable.

Heat-curable polymer dispersions are known to be aqueous dispersions of heat-curable polymers or prepolymers, as described above. In particular, such polymer dispersions comprise at least one polymer component based on a polyurethane or based on an emulsion polymer of ethylenically unsaturated monomers, the polymer component having hydroxyl groups, keto groups, urea groups, epoxide groups and/or carboxyl groups, and at least one low molecular weight or polymeric crosslinking agent having at least 2 reactive groups, as mentioned above.

Surface treatment compositions based on self-crosslinking and crosslinkable polymer dispersions may comprise the additives mentioned in the case of the surface treatment compositions based on physically drying dispersions. Frequently, they comprise a catalyst which promotes the crosslinking reaction, for example an acid or, in the case of isocyanate-based systems, organotin compounds. They may be formulated in an analogous manner without pigments, i.e. as clear varnishes, as glazes and high gloss and silk luster varnishes having a low pigment content, and as silk luster and matt varnishes having higher pigment volume concentrations. Aqueous dispersions of self-crosslinking and crosslinkable polymers for the preparation of such surface treatment compositions are known and are commercially available, for example under the Luhydran brands A 848S, A 875S and LR8950 from BASF Aktiengesellschaft.

According to a further embodiment of the invention, the surface treatment composition is a water-based, UV-curable coating composition. This is known to be a water-based coating composition which comprises, as a binder constituent, at least one binder polymer or prepolymer which is dispersed in water and has ethylenically unsaturated double bonds which are capable of undergoing free radical polymerization under the action of electromagnetic radiation, such as UV radiation or electron beams. Regarding the content of ethylenically unsaturated double bonds in the polymer and the type of double bonds, the statements made above are applicable. In particular, the double bonds are those of the formula A defined above and especially acrylate or methacrylate groups. Such polymers are also referred to as (meth)acrylate-modified polymers. In particular the UV-curable binder polymers dispersed in water are (meth)acrylate-modified polyurethanes or (meth)acrylate-modified copolymers based on alkyl (meth)acrylates. Regarding the photoinitiators, reactive diluents and other formulation constituents, the statements made above are applicable. Aqueous dispersions of UV-curable binder polymers for the preparation of such surface treatment compositions are known, for example from the literature mentioned above for UV coating compositions, and are commercially available, for example under the Laromer brands of BASF Aktiengesellschaft, e.g. Laromer LR 8949.

In a further embodiment of the invention, the surface treatment composition is a water-based dual-cure coating composition. This is understood as meaning a water-based coating composition which comprises one or more polymeric or oligomeric binder constituents which are dispersed in water and are both crosslinkable by UV radiation and heat-crosslinkable and accordingly have both functional groups which polymerize under the action of high-energy radiation and functional groups which react with one another on heating with bond formation. As a rule, such binder systems comprise at least one binder polymer or prepolymer A which is dispersed in water and has ethylenically unsaturated double bonds which are capable of free radical polymerization under the action of electromagnetic radiation, and functional groups which react with one another or with a further low molecular weight, oligomeric or polymeric binder constituent B which has reactive functional groups of complementary reactivity and, if appropriate, UV-curable double bonds, with bond formation. Examples of A are unsaturated polymers which carry hydroxyl groups and have ethylenically unsaturated double bonds, e.g. polyesterpolyols. Examples of C are polyisocyanates which carry acrylate or methacrylate groups, wherein the isocyanate groups may be reversibly blocked. Further examples of A are polymers or prepolymers having (meth)acrylate groups, which additionally have free or reversibly blocked isocyanate groups, in these cases a polyhydroxy compound and/or a polyamine being used as component B. Dual-cure binder systems may also comprise the following binder constituents: a first oligomeric or polymeric binder constituent A' having reactive functional groups, e.g. a polyisocyanate, a further saturated binder constituent B' having reactive groups complementary thereto, e.g. a polymer carrying OH groups, such as a polyacrylate having OH groups, and a reactive group complementary to A' or B', e.g. a low molecular weight, oligomeric or polymeric compound which carries OH groups and additionally has ethylenically unsaturated double bonds. Regarding the content of ethylenically unsaturated double bonds in the polymer or oligomer and the type of double bonds, the statements made above are applicable. In particular, the double bonds in dual-cure systems are those of the formula A defined above and especially acrylate or methacrylate groups. According to one embodiment, the dual-cure binders dispersed in water comprise at least one (meth)acrylate-modified polyurethane having free OH groups and/or reversibly blocked isocyanate groups or (meth)acrylate-modified copolymers having free OH groups, based on alkyl (meth)acrylates, and a crosslinking substance. According to another embodiment, dual-cure binders dispersed in water comprise a reversibly blocked isocyanate carrying (meth)acrylate groups and an unsaturated polyesterpolyol. According to a further embodiment, the dual-cure binders dispersed in water comprise a reversibly blocked isocyanate carrying (meth)acrylate groups, a substantially saturated polymeric polyol component, e.g. a polyacrylate carrying OH groups, and a polyisocyanate component whose isocyanate groups may be reversibly blocked. The abovementioned dual-cure systems may also be solvent-based and are equally suitable for step c) of the method according to the invention. Regarding the type of reactive functional groups and the type of crosslinking agent, the statements made above for heat-curable systems are moreover applicable. Regarding the photoinitiators, reactive diluents, catalysts and other formulation constituents, the statements made above are applicable.

Both aqueous and nonaqueous dual-cure systems for the preparation of such surface treatment compositions are known, for example from W. Fischer et al. "Dual Cure; Combination of Superior Properties", Radtech Report, November/December 2001, DE 19818735, EP-A 928800, WO 2002/26853 and literature cited therein, D. B. Pourreau, Acrylic Urethane Dual-Cure Clearcoats, 5: UV & EB Technology Expo & Conference, May 3-5, 2004, Charlotte N.C., S. Peeters in "Radiation Curing in Polymer Science and Technology", Vol. 3, (J. P. Fouassier, J. F. Rabek, Editor), Elsevier 1993, page 177, R. Koniger, Farbe und Lack, 1999, 105(4), page 233, K. Maag et al. Progr. Org. Coat. 2000, 40, page 93, W. Fischer et al., Farbe und Lack, 2001, 107(3), page 120, C. Decker et al., Macromol. Mater. Eng. 288 (2003), page 17, and are commercially available, for example under the tradenames DynaSeal® and Laromer® from BASF Aktiengesellschaft, e.g. Laromer LR 9000.

The aqueous coating compositions suitable according to the invention furthermore include water-based and water-dilutable alkyd resin finishes (see above) and mixtures thereof with water-based coating compositions based on aqueous polymer dispersions, which may be self-crosslinking, crosslinkable or physically drying.

A further embodiment of the invention relates to aqueous stains. These are known to be aqueous dye solutions which comprise at least one dye in dissolved form. In addition to water, the stain may also comprise water-miscible organic solvents as solubilizers. Their proportion is typically below 50% by volume, based on the total weight of the composition, e.g. in the range from 1 to 50% by volume. Suitable organic cosolvents are in particular alcohol, especially ethanol, isopropanol, propanol, butanol, glycol, propanediol and butylglycol, and furthermore ether alcohols, such as diethylene glycol, butyidiglycol, methoxypropanol, dipropylene glycol, diethylene glycol methyl ether and triethylene glycol, and ketones, such as acetone. Suitable dyes are, for example, the dyes described in DE-A 10245209 and the compounds designated as disperse dyes and as solvent dyes according to the color index, which are also referred to as dispersion dyes, and in particular metal complex dyes. A list of suitable dispersion dyes is to be found, for example, in Ullmanns Enzyklopadie der technischen Chemie, 4th Edition, Vol. 10, pages 155-165 (cf. also Vol. 7, page 585 et seq.—Anthrachinonfarbstoffe; Vol. 8, page 244 et seq.—Azofarbstoffe; Vol. 9, page 313 et seq.—Chinophthalonfarbstoffe). This literature reference and the compounds mentioned therein are hereby incorporated by reference. Dispersion dyes and solvent dyes suitable according to the invention comprise a very wide range of dye classes having different chromophores, for example anthraquinone dyes, monoazo and disazo dyes, quinophthalones, methine and azamethine dyes, naphthalimide dyes, naphthoquinone dyes and nitro dyes. Examples of dispersion dyes suitable according to the invention are the dispersion dyes of the following color index list: C. I. Disperse Yellow 1-228, C. I. Disperse Orange 1-148, C. I. Disperse Red 1-349, C. I. Disperse Violet 1-97, C. I. Disperse Blue 1-349, C. I. Disperse Green 1-9, C. I. Disperse Brown 1-21, C. I. Disperse Black 1-36. Examples of solvent dyes suitable according to the invention are the compounds of the following color index list: C. I. Solvent Yellow 2-191, C. I. Solvent Orange 1-113, C. I. Solvent Red 1-248, C. I. Solvent Violet 2-61, C. I. Solvent Blue 2-143, C. I. Solvent Green 1-35, C. I. Solvent Brown 1-63, C. I. Solvent Black 3-50. Dyes suitable for stains are furthermore derivatives of naphthalene, of anthracene, of perylene, of terylene and of quarterrylene, and diketopyrrolopyrrole dyes, perinone dyes, coumarin dyes, isoindoline and isoindolinone dyes, porphyrine dyes, phthalocyanine dyes and naphthalocyanine dyes. The concentration of the dye in the stain is typically in the range from 1 to 10% by weight, based on the total weight of a commercial stain, if appropriate the stain being diluted before use with water to 1.5 to 10 times its original volume. Examples of aqueous stains are the products of BASF Aktiengesellschaft which are sold under the tradenames Basantol and Basantol U.

The application of the surface treatment compositions is effected in a manner known per se, for example by rollcoating, spreading, knife coating or spraying, the method of application depending in a manner known per se on the type of surface treatment composition, the type and form of the wood/woodbase material to be treated and the technical circumstances.

The application of the surface treatment composition can be effected in one step or in a plurality of steps, for example in 1, 2 or 3 steps. Furthermore, 2 or more surface treatment compositions, in particular coating compositions, for example one or more primers or undercoats in combination with one or more top coats, can also be applied in succession, so that a multilayer, for example a 2-, 3-, 4- or 5-layer coating structure is obtained. Drying and/or curing steps can be carried out between the individual application steps. Depending on the type of surface treatment composition and on the desired coating, the surface treatment compositions may also be applied wet-in-wet.

The amount of surface treatment composition applied depends in a manner known per se on the desired properties of the treated surface and is typically in the range from 1 to 500 g/m$^2$ calculated as nonvolatile constituents in the surface treatment composition. In the case of a multilayer structure, the amount of surface treatment composition is typically from 1 to 200 g/m$^2$ per layer.

As a rule, the application of the surface treatment composition also comprises a drying step. Here, the volatile constituents of the surface treatment composition which, if appropriate, are present are removed and/or curing of the curable constituents present in the surface treatment composition is carried out. Accordingly, the drying conditions depend in a manner known per se on the type of surface treatment composition. In the case of physically drying coating compositions, the drying temperature is typically in the range from 20 to 80° C. and the duration of drying is in the range from 10 min to 24 h. In the case of heat-crosslinkable systems, the duration of drying and the drying temperature depend in a manner known per se on the reactivity of the functional groups and on the type of system chosen, in principle temperatures in the range from 20° C. to 220° C. being suitable. The curing of UV-curable systems is effected by the use of actinic radiation, such as UV light or electron beams. In the case of dual-cure systems, first UV curing and then heat curing will as a rule be carried out.

The surface treatment composition may also be a thermoplastic film, for example an acrylonitrile/styrene-acrylate film, which is laminated with the surface of a wood or woodbase material with application of reduced pressure and, if appropriate, with the aid of a glue composition. Such compositions and the methods required for this purpose are known to the person skilled in the art and are commercially available under the tradenames LuranSkin® and PermaSkin® from BASF Aktiengesellschaft.

The surface treatment composition may also be a liquid water repellent, as frequently used for the surface treatment of wood, for example a liquid wax or an oil, for example a vegetable oil, such as rapeseed oil or linseed oil, a liquid paraffin oil, e.g. white oil or the like, or a silicone oil. In these cases, improved stability to weathering and better penetration of the liquid water repellent into the pores of the wood and hence improved stability of the treated surface to weathering and moisture influences are generally achieved.

The following examples are intended to illustrate the invention and are not to be understood as being limiting.

Impregnation of Wood Materials

PREPARATION EXAMPLE 1

DMDHEU modified with diethylene glycol and methanol (mDMDHEU) was diluted to 30% by weight with water and mixed with 1.5% by weight of $MgCl_2.6\ H_2O$. Pinewood boards dried to about 12% wood moisture content and having the dimensions 150×10×2.5 cm were introduced into an impregnation unit. In the impregnation unit, a reduced pressure of 40 mbar (absolute) was applied for 30 minutes. The impregnation unit was then flooded with the impregnating agent. The reduced pressure of 50 mbar absolute was kept constant. A pressure of 10 bar was then applied for 2 hours. The pressure phase was ended and the residual liquid was removed. The wood boards were then stored in a drying chamber controllable via temperature and atmospheric humidity and fixed so that distortion was impossible. The chamber was brought to 120° C. and a relative humidity of about 95%. These humid conditions were maintained until a temperature of at least 120° C. was reached for up to 48 hours in the interior of the wood bodies.

The subsequent drying of the wood bodies was carried out on a thoroughly ventilated wood stack. The boards were then sawn into small test boards having the dimensions 30×10×2.5 cm.

Surface Treatment

EXAMPLE 1

Nonaqueous UV-Curable Coating Compositions

A pinewood board produced according to preparation example 1 was first coated with 25 g/m² of a primer by means of a spray gun and then subjected to initial curing in an IST coating unit with 2 UV lamps (120 W/cm² each) and a conveyor belt running speed of 5 m/min. Thereafter, the coating thus obtained was again coated with 25 g/m² of a primer and cured and sanded twice in the IST coating unit at a conveyor belt running speed of 5 m/min. A top coat in an amount of 10 g/m² was applied to the coating thus obtained, and the coating thus obtained was cured twice in the IST coating unit at a conveyor belt running speed of 5 m/min.

The compositions of primer and top coat are shown in table 1.

TABLE 1

UV-curable coating composition:

| Composition | Primer | Top coat |
|---|---|---|
| Resin A | 64.2 | 43.7 |
| Reactive diluent | 21.4 | 43.7 |
| Syloid ED 80 |  | 8.7 |
| Microtalc AT 1 | 10.7 |  |
| Irgacure 500 | 3.2 |  |
| Irgacure 184 |  | 3.5 |
| Byk 361 | 0.5 | 0.4 |

Resin A: Laromer ® UP 35 D: 55% strength by weight solution of an unsaturated polyester in dipropylene glycol diacrylate,
Reactive diluent: Laromer ® DPGDA from BASF: dipropylene glycol diacrylate,
Syloid ED 80: finely divided silica
Microtalc AT1: talc powder
Irgacure ® 500 from Ciba-Spezialitätenchemie (mixture of benzophenone and 1-benzoyl-1-hydroxycyclohexane in the weight ratio of 1:1),
Irgacure ® 184: photoinitiator from Ciba-Spezialitätenchemie
Byk 361: leveling agent

COMPARATIVE EXAMPLE 1

For comparative purposes, an untreated pinewood board was coated in the manner stated for example 1.

EXAMPLE 2

Self-Crosslinking Coating Composition

A pinewood board produced according to preparation example 1 was first coated with a self-crosslinking coating composition according to formulation R2 in a wet layer thickness of 20 μm by means of a spray gun, dried, and coated again with the coating composition according to formulation R2 in a wet layer thickness of 27 μm. Drying was then effected at room temperature, the coating having reached its final strength after about 2 days.

For comparative purposes, an untreated pinewood board was coated in the same manner.

The pinewood boards thus coated were subjected to a crosshatch test according to DIN ISO EN 2409 after 2, 5 and 7 days. The pinewood boards produced for comparative purposes received the rating 2, whereas the pinewood board obtained according to example 2 received the rating 2-3, wood also chipping off superficially in contrast to the comparison.

The pinewood boards thus coated were subjected to a UV weathering test after drying at room temperature. The boards according to the invention showed a smaller color change than the pinewood boards of the comparison.

Formulation R2:

| | |
|---|---|
| 50 parts by weight | of butylglycol |
| 20 parts by weight | of propylene glycol butyl ether |
| 20 parts by weight | of dipropylene glycol monomethyl ether |
| 5 parts by weight | of soybean lecithin (soybean lecithin W250) |
| 4 parts by weight | of antifoam (Agitan 232 from Munzing Chemie) |
| 15 parts by weight | of finely divided silica (Syloid ED 30) |
| 36 parts by weight | of water |
| 780 parts by weight | of a 45% strength by weight, anionic, self-crosslinking aqueous poly(meth)acrylate dispersion based on butyl methacrylate (BASF AG) |
| 70 parts by weight | of Polygen WE1. aqueous wax dispersion of a polyoxidate wax (wax oxidate based on a polyethylene wax) |

EXAMPLE 3

Aqueous Dual-Cure Coating Composition

A pinewood board produced according to preparation example 1 was coated with a dual-cure coating composition according to formulation R3 or with formulation R3a by means of a spray gun, UV-cured as in example 1 and then heat-cured.

For comparative purposes, an untreated pinewood board was coated in an analogous manner.

Both the coating composition R3 and the coating composition R3a had substantially better wet adhesion to the pinewood boards according to preparation example 1 than to the untreated pinewood boards.

Formulation R3: 100 parts by weight of Laromer® LR 9000 and 3 parts by weight of Irgacure 500 (see above)

Formulation R3a: 100 parts by weight of Laromer® LR 9000, 3 parts by weight of Irgacure 500 (see above) and 10 parts by weight of a 1% strength by weight solution of dibutyltin dilaurate in butyl acetate.

Laromer® LR 9000: Isocyanate-functionalized allophanate-polyurethane acrylate

EXAMPLE 4

In a manner analogous to example 3, untreated pinewood boards and pinewood boards according to preparation example 1 were coated with an aqueous polyurethane dispersion modified with acrylate groups (Laromer® LR 8949 from BASF) and were UV-cured.

Laromer® LR 8949 from BASF: 40% strength by weight aqueous polyurethane dispersion; $M_n$ about 1000; 0.17 mol of acrylate groups/100 g of resin.

EXAMPLE 5

Aqueous Stains

The following commercial stains were diluted to a solids content of 3% by weight with 1:1 water:ethanol. Pinewood boards from preparation example 1 as well as untreated pinewood boards were sanded, smoothed in each case on one half using emery paper. The diluted stains were then applied and the boards were dried at 50° C.

In all cases, the pinewood boards from preparation example 1 exhibited faster drying behavior and a substantially smoother surface both in the sanded and in the unsanded regions. The untreated boards were distorted, whereas the boards from preparation example 1 showed no distortion.

Stains Tested:
Basantol U Yellow 145 liquid
Basantol U Yellow 155 liquid
Basantol U Orange 255 liquid
Basantol U Red 345 liquid
Basantol U Blue 745 liquid
Basantol U Black X 84 liquid
Basantol Yellow 099 liquid
Basantol Yellow 215 liquid
Basantol Brown 269 liquid
Basantol Orange 273 liquid
Basantol Red 311 liquid
Basantol Bordeaux 415 liquid
Basantol Blue 762 liquid
Basantol Black X82 liquid

We claim:

1. A method for the treatment of the surfaces of wood or woodbase materials, which comprises:
   a) impregnating wood, woodbase materials or wood materials for the production of woodbase materials with a curable aqueous composition which comprises at least one crosslinkable compound having a molecular weight of at most 400 Daltons, which are selected from
      α) compounds V which have at least two N-bonded groups of the formula $CH_2OR$, where R is hydrogen or $C_1$-$C_4$-alkyl, and/or a 1,2-bishydroxyethane-1,2-diyl group bridging two nitrogen atoms, and
      γ) reaction products or mixtures of the compound V with at least one alcohol which is selected from $C_1$-$C_6$-alkanols, $C_2$-$C_6$-polyols and oligoalkylene glycols;
   where the conditions of impregnation are chosen so that the amount of curable constituents of the aqueous composition which is absorbed is at least 5% by weight, based on the dry mass of the untreated wood or woodbase material,
   b) treating the material obtained in a) at elevated temperature and, optionally, further processing to give a woodbase material; and
   c) treating at least one surface of the wood or woodbase material to be treated with a surface treatment composition comprising a polymeric binder and/or prepolymer curing in the form of a polymeric binder and, optionally, drying of the surface treatment composition.

2. The method according to claim 1, wherein the surface treatment composition comprises a polymer and/or prepolymer which can be crosslinked by heat or UV radiation.

3. The method according to claim 2, wherein the binder is a polymer or prepolymer which comprises acrylate and/or methacrylate groups.

4. The method according to claim 2, wherein the binder is a heat-curable 2-component system.

5. The method according to claim 1, wherein the surface treatment composition is selected from water-based surface treatment compositions.

6. The method according to claim 5, wherein the surface treatment composition comprises a polymeric binder in the form of an aqueous polymer dispersion.

7. The method according to claim 6, wherein the aqueous polymer dispersion is a physically drying dispersion.

8. The method according to claim 6, wherein the aqueous polymer dispersion is a self-crosslinking dispersion.

9. The method according to claim 6, wherein the aqueous polymer dispersion has acrylate and/or methacrylate groups.

10. The method according to claim 1, wherein the crosslinkable compound of the curable composition is selected from
    1,3-bis(hydroxymethyl)-4,5-dihydroxyimidazolidin-2-one,
    1,3-bis(hydroxymethyl)-4,5-dihydroxyimidazolidinone which is modified with a $C_1$-$C_6$-alkanol, a $C_2$-$C_6$-polyol or an oligoalkylene glycol,
    1,3-bis(hydroxymethyl)urea,
    1,3-bis(methoxymethyl)urea;
    1-hydroxymethyl-3-methylurea,
    1,3-bis(hydroxymethyl)imidazolidin-2-one (dimethylolethyleneurea),
    1,3-bis(hydroxymethyl)-1,3-hexahydropyrimidin-2-one (dimethylolpropyleneurea)
    1,3-bis(methoxymethyl)-4,5-dihydroxyimidazolidin-2-one (DMeDHEU), and
    tetra(hydroxymethyl)acetylenediurea.

11. The method according to claim 1, wherein the concentration of the crosslinkable compound in the aqueous curable composition is in the range of from 10 to 60% by weight, based on the total weight of the composition.

12. The method according to claim 1, wherein the aqueous composition additionally comprises a catalyst K which effects curing of the crosslinkable compound.

13. The method according to claim 12, wherein the catalyst K is selected from metal salts from the group consisting of the metal halides, metal sulfates, metal nitrates, metal phosphates, metal tetrafluoroborates; boron trifluoride; ammonium salts from the group consisting of the ammonium halides, ammonium sulfate, ammonium oxalate and diammonium phosphate; organic carboxylic acids, organic sulfonic acids, boric acid, phosphoric acid, sulfuric acid and hydrochloric acid.

14. A surface-treated wood or woodbase material which is obtained by a method according to claim 1.

* * * * *